July 15, 1952  H. KIRKHAM  2,603,235
FLOW CONTROL VALVE
Filed Aug. 6, 1945  4 Sheets-Sheet 1
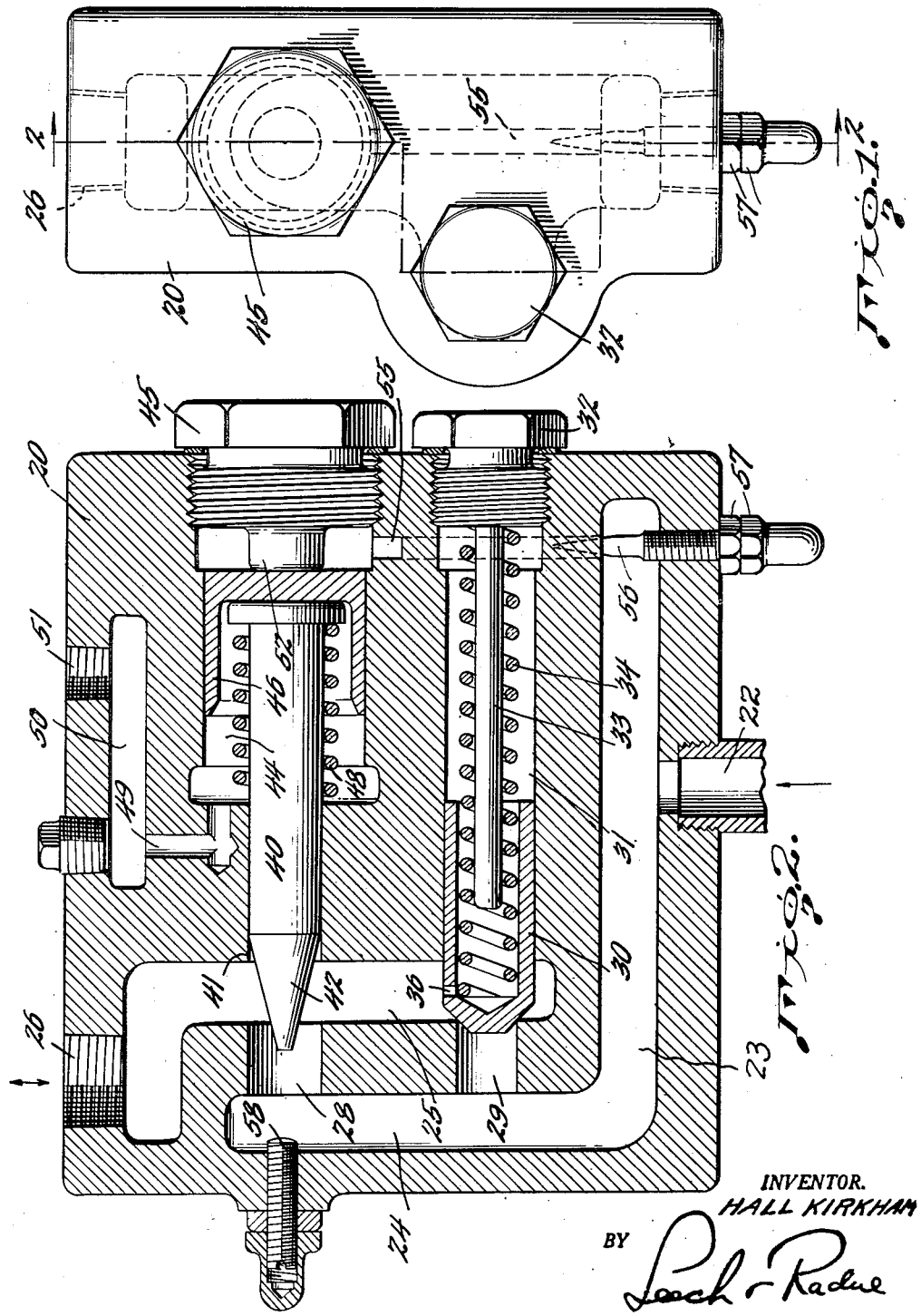
INVENTOR.
HALL KIRKHAM
BY
*Leech & Radue*
ATTORNEYS July 15, 1952

H. KIRKHAM 2,603,235

FLOW CONTROL VALVE

Filed Aug. 6, 1945

INVENTOR.
HALL KIRKHAM
BY
Leach & Radue
ATTORNEYS

July 15, 1952 H. KIRKHAM 2,603,235
FLOW CONTROL VALVE
Filed Aug. 6, 1945 4 Sheets-Sheet 3

INVENTOR.
HALL KIRKHAM,
BY
Leech & Radue
ATTORNEYS

July 15, 1952  H. KIRKHAM  2,603,235
FLOW CONTROL VALVE
Filed Aug. 6, 1945  4 Sheets-Sheet 4

INVENTOR.
HALL KIRKHAM,
BY
Leech & Radue
ATTORNEYS

Patented July 15, 1952

2,603,235

UNITED STATES PATENT OFFICE 2,603,235

FLOW CONTROL VALVE

Hall Kirkham, Cleveland, Ohio, assignor, by mesne assignments, to The New York Air Brake Company, New York, N. Y., a corporation of New Jersey Application August 6, 1945, Serial No. 609,150

13 Claims. (Cl. 137—493)

This invention relates to valves and more particularly to automatic flow control valves for use between a hydraulic hoist or the like and the manually or automatically operated valve serving to determine whether the hoist is to be raised, held or lowered.

It is a general object of the present invention to provide novel and improved types of flow control valves for regulating the rate of lowering of hydraulic hoists to render the same independent of the weight of the load.

More particularly it is an object of the invention to provide a simple, compact and novel flow control valve adapted to be positioned between a hydraulic hoist and the valve determining the admission of fluid to and the return of fluid from the same, and having automatic means dependent on fluid pressure to regulate the return of liquid from the hoist to a tank or reservoir at a rate which is independent of the load.

It is an important object of the invention to provide flow control valves combining dual delivery paths for hydraulic fluid to a hoist together with means for automatically closing off one of the paths and controlling the area of the second one in accordance with the pressure on the returning liquid resulting from the load on the hoist.

One of the important features of the invention comprises the arrangement of the valve housing whereby it is adapted to interchangeably receive one of several types of flow controlling plungers whereby the device may be readily adapted to the particular load conditions pertaining to any specific installation.

Other and further features and objects of the invention will be more apparent to those skilled in the art upon a consideration of the accompanying drawings and following specification wherein are disclosed several exemplary embodiments of the invention with the understanding that such modifications may be made therein as fall within the scope of the appended claims without departing from the spirit of the invention.

In said drawings:

Fig. 1 is an end elevation of a flow control valve constructed in accordance with the present invention;

Fig. 2 is a longitudinal vertical section thereof taken on broken line 2—2 of Fig. 1;

In the operation of hydraulic hoists, which term is used generally to include hydraulic jacks, lifting devices and the like, the most difficult problem presented is that of controlling the speed of lowering. The speed of raising of the hoist is simply regulated by the capacity of the pump, by the use of a fixed orifice or by the throttling action of a manual control valve. For lowering purposes, however, it is desirable that the manual or other control valve be open to its maximum for various reasons. The liquid returning from the hoist is discharged into a reservoir or tank at substantially zero pressure so that normally the only resistance to lowering is in the restriction to flow imposed by the piping and the ports in the control valves. Under these conditions the rate of lowering is substantially in direct ratio to the load on the hoist. With heavy loads the rate of lowering may be dangerous or destructive to the load and/or the hoist.

If control is effected by the use of a fixed orifice, then the lowering speed will be increased as the load is increased and if the orifice size is reduced to govern the heaviest load expected to be encountered, then lighter loads will lower at too slow a speed and the power requirements for raising will be increased. Raising through a check valve controlled passage and lowering through a fixed orifice will assure minimum power being used for raising but will not cure the lowering speed evil for it will still be governed by the load.

Flow control valves in accordance with the present invention make use of a check valve controlled orifice for raising, but lower through an orifice controlled by a movable plunger dependent for its position on the pressure of the liquid on the tank side of the control orifice.

Figure 7:
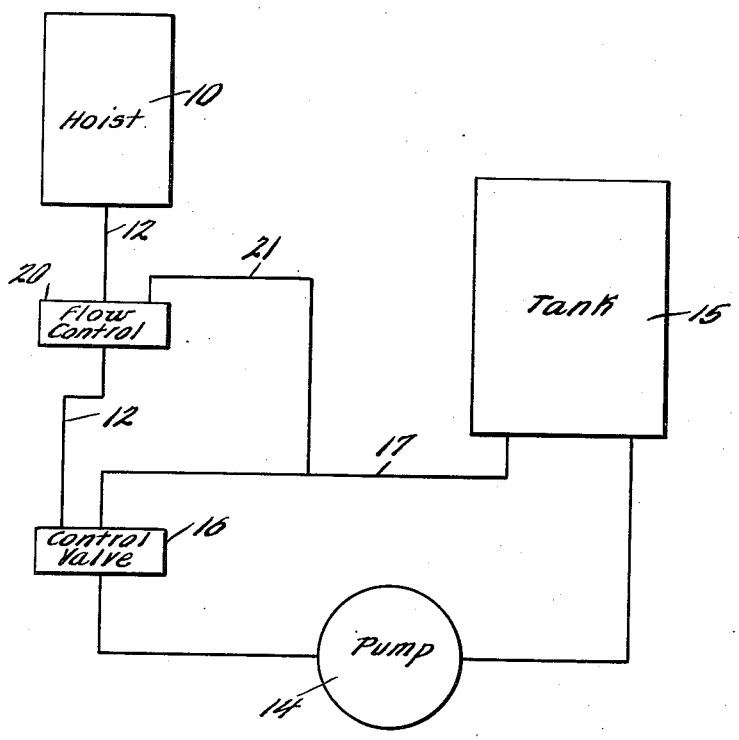
Fig. 7 is a schematic and diagrammatic illustration of the piping arrangements of a hoist, flow control valve and associated parts used in accordance with the present invention.

Referring first to Fig. 7 a conventional system of a tank, pump and hoist is illustrated. The hoist 10 may be assumed to be of the single acting type, receiving fluid under pressure through pipe 12 from the positive displacement, constantly driven pump 14 which takes its supply from tank 15 and delivers it to the hoist through a suitable manually manipulated control valve 16, which may be positioned first to cause high pressure liquid from the pump to be delivered to the hoist to lift the same. When in a second position the control valve holds the load in its elevated position and permits the pump to circulate fluid to and from the tank at zero pressure. In a third position this valve connects the pipe 12 to pipe 17 for returning liquid from the hoist to the tank under the weight of the load.

The flow control valve 20 of the present invention is introduced into the pipe 12 between the hoist and the manual control valve 16. As will appear later, it has a vent pipe 21 returning to the tank as shown.

Construction of valve 20 is best illustrated in Figs. 1 and 2 where a substantially rectangular cast housing accommodates the working parts and fluid ducts. It is divided into the chambers formed by a plurality of cored and/or drilled passages, ports, pressure cylinders and the like, as will now be described.

Liquid is delivered under pressure from the pump and the manual control valve through a suitable pipe threaded into port 22 where it is diverted into passage 23 having a connected vertical portion 24 which is paralleled by a passage 25 connecting at its upper end to the port 26 which leads to the hoist. Parallel bores 28 and 29 connect passages 24 and 25 for the control of the flow of liquid between port 22 and port 26.

Bore 29 is normally closed by the tapered left end of a check valve plunger 30 operating in a cylindrical bore 31 coaxial with bore 29 and closed at the right hand end by screw plug 32 which carries the pin 33 forming a guide for the helical spring 34 whose left end is received within the hollow plunger 30, bears against its bottom and maintains it closed on the seat at the junction of bore 29 and passage 25. A radial opening 36 through the lower wall of the plunger insures against trapping liquid behind it which might prevent its operation and also permits liquid pressure in 25 to assist in holding the plunger on its seat.

It will be seen that when the hoist is to be lifted the application of high pressure fluid to the port 22 forces open check valve 30 by pressure on its lower face and liquid flows unrestricted to the hoist port 26. Some liquid also follows a parallel path through passage 28 which is, however, largely restricted by control plunger 40.

This control plunger operates in a bore 41 coaxial with bore 28. It comprises a headed pin having a tapered valving end 42 to regulate the annular area of bore 28 through which liquid may pass from 25 to 24 on its return to the tank. The bore 41 opens into an enlarged cylindrical chamber 44 closed at the right end by screw plug 45 and housing the cup-like piston 46 in the hollow of which the head of the plunger 40 is received. It is maintained against the bottom of the piston by means of helical spring 48 whose left end bears against the bottom wall of the recess 44. This recess 44 on the plunger end of piston 46 is vented by passages 49 and 50 to the outlet 51 to which pipe 21 is connected for returning any liquid to the tank which may seep into the chamber 44 from passage 25 or from the chamber at the right of the piston.

The piston 46 is normally maintained against stop 52 on plug 45 by spring 48 and the space behind the piston is connected by a small vertical bore 55 with the right hand end of passage 23. As seen in Fig. 1 this passage clears the bore 31 for the check valve plunger which is offset as clearly illustrated in this figure. The rate of flow of liquid into passage 55 is controlled by needle valve 56 threaded through the lower wall of the housing and secured by lock and cap nuts 57 with appropriate packings.

The maximum movement by the control valve plunger 40 toward closed position is regulated by a stop screw 58 threaded through the left wall of the housing and secured by lock and cap nuts. It should be set to prevent complete closure by plunger 40.

In operation the valve is connected as illustrated in Fig. 7. When the manual control valve 16 is positioned to raise the hoist, fluid flows into port 22 and passages 23 and 24, forces the check valve back and flows through bore 29 and passage 25 to hoist port 26 so that liquid flow is unrestricted when lifting the hoist and the speed of lifting is dependent only upon the capacity of the pump and the setting of the manual valve. A second path is provided for the liquid by way of 23, 24, 28 and 25, but this is of limited capacity since the high pressure in 23 acts through 55 to move plunger 40 to the left against its stop.

When it is desired to lower the hoist, the manual valve is opened to allow liquid to return from the hoist to the reservoir. This liquid enters the valve 20 through port 26, flows into passage 25 but meets the closed check valve, held shut by its spring assisted by the pressure of liquid within the same entering through passage 36. Fluid flows around the tapered end of plunger 42, through bore 28 and into passages 24 and 23 and out through port 22 to the tank. Obviously in a construction such as this some fixed orifice is essential to provide pressure for operating the valve plunger 40. Such an orifice in this case may well be the port opening 22 through the lower wall of the housing or rather the inside diameter of the pipe threaded therein and will be so considered for purposes of this explanation. If desired a restriction may be incorporated in port 22 and having a diameter substantially equivalent to the inside diameter of the connecting pipe, which is usually the standard pipe size. The liquid being forced to return to the tank by the load on the hoist is restricted at this orifice and pressure builds up in 23 which is dependent entirely on the load on the hoist. This pressure is delivered through passage 55 to the right hand end of piston 46, which, because of its preponderance of area, moves plunger 40 toward the left, against the same fluid pressure exerted on its left end, until the annular area between 28 and 42 is reduced to a point where balance is achieved between the spring 48 and the now lower pressure in 23 and 55 because of this reduced flow around 42 in respect to the capacity of the fixed orifice 22. A balance is reached and the plunger remains stationary. The plunger will assume a position to always allow such a quantity of oil to pass around it that the hoist will lower at the same speed independent of the load thereon. It will be seen that a light load will provide but little pressure in 23 and hence the large piston will not move the plunger 40 much toward a closing position. No greater quantity of oil will flow around the tapered end than if high pressure existed because of the lower pressure forcing the oil to return. On the other hand a large load on the hoist will increase the pressure in 23 and force the plunger 40 farther to the left until the flow is sufficiently restricted.

The restrictive needle valve 56, controlling the flow from 23 into passage 55, serves to prevent pulsations in the event of sudden changes in pressure in chamber 23. The cushioning action on piston 46 resulting from the restricted orifice occasioned by valve 56 prevents any jerkiness of operation in the lowering so that this is accomplished in a very even, steady manner. To further prevent any jerky action the adjusting screw 58 is positioned to prevent complete closing of plunger 40 under any initial impulse which may be given to it. This screw also permits a determination of the maximum speed at which lowering is accomplished.

Figure 3:
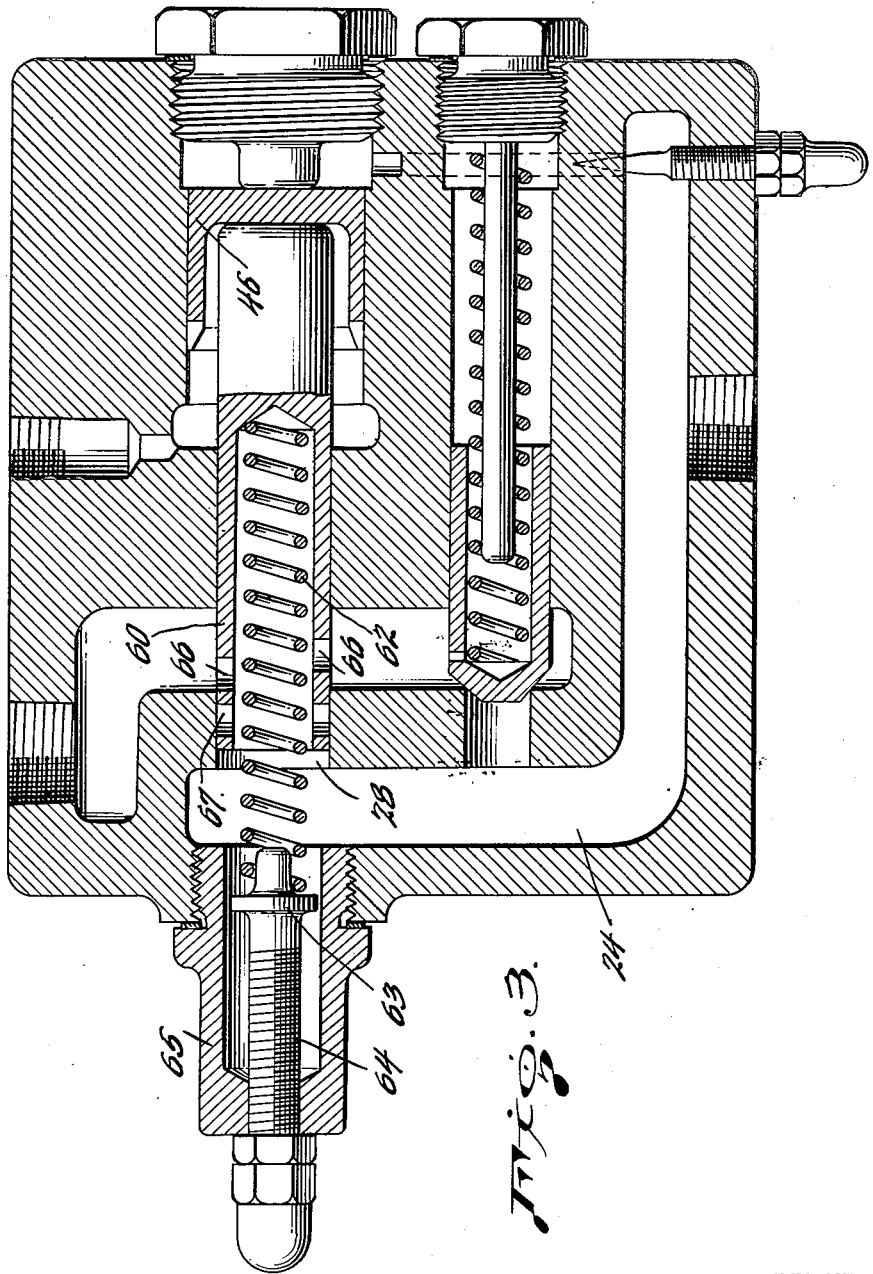
Fig. 3 is a view similar to Fig. 2 showing a modified construction using the same housing but a different control plunger.

In Fig. 3 the showing is substantially identical with that in Figs. 1 and 2 except for a change in the valve plunger controlling the bore 28. In this case the plunger 60 is a hollow tubular one with the central bore open toward the left and accommodating the helical spring 62 whose left end abuts against a collar 63 on adjusting screw 64 threaded into cap 65 and permitting adjustment of the tension of the spring to regulate the lowering rate. The bore in the cap 65 is of less diameter than that of the plunger 60 so that the plunger may abut the annular end of the cap to limit its movement toward the left.

The control of flow by plunger 60 is effected through the degree of exposure of staggered openings 66 passing radially through its walls. As the plunger is moved toward the left under the action of the large piston 46 successive areas of these openings 66 are eclipsed in the bore 28 and reduced flow is effected. Additional radial passages 67 near the outer end of the valve plunger insure against closing off the valve for flow into passage 24 by being exposed therein when the valve plunger bears against the stop at the left.

The construction of this valve is otherwise no different from that just described and the operation is the same, but at higher pressures the valve with the radial ports permits better control with less tendency toward chattering. Because of the ability to regulate the load on spring 62 the valve assembly may be of more universal use.

Figure 4:
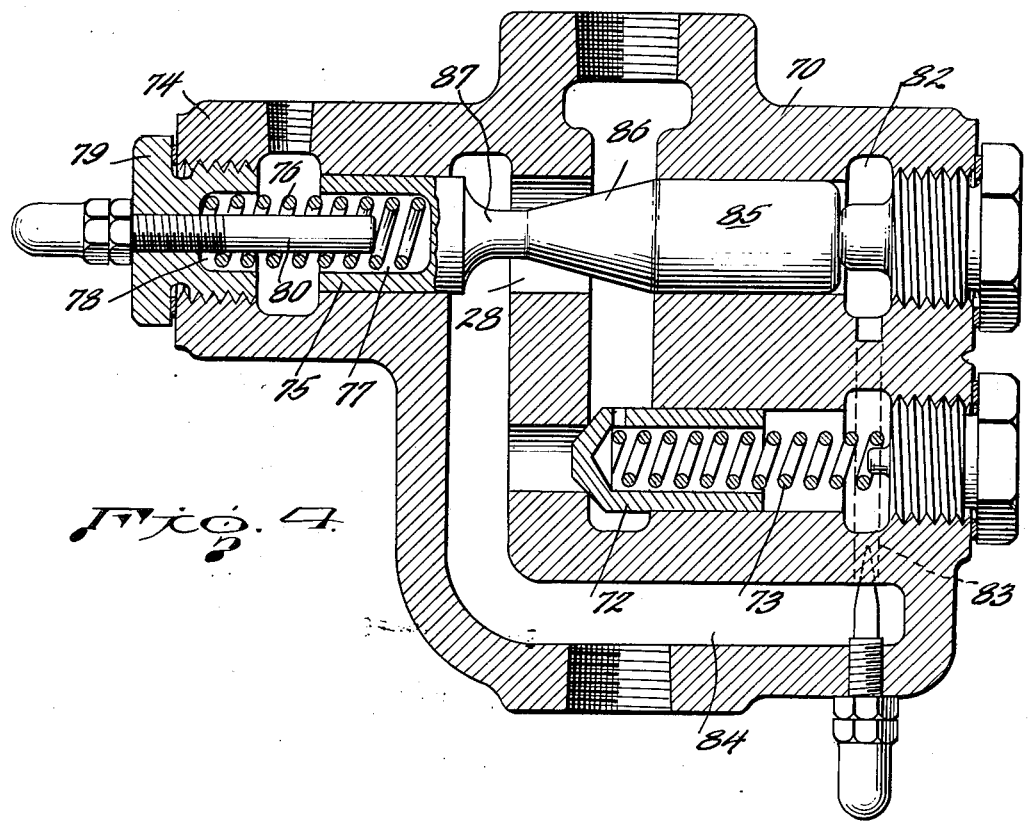
Fig. 4 is a view similar to Figs. 2 and 3 but showing a slight modification in the shape of the housing and the use of a different control plunger.
Figure 5:
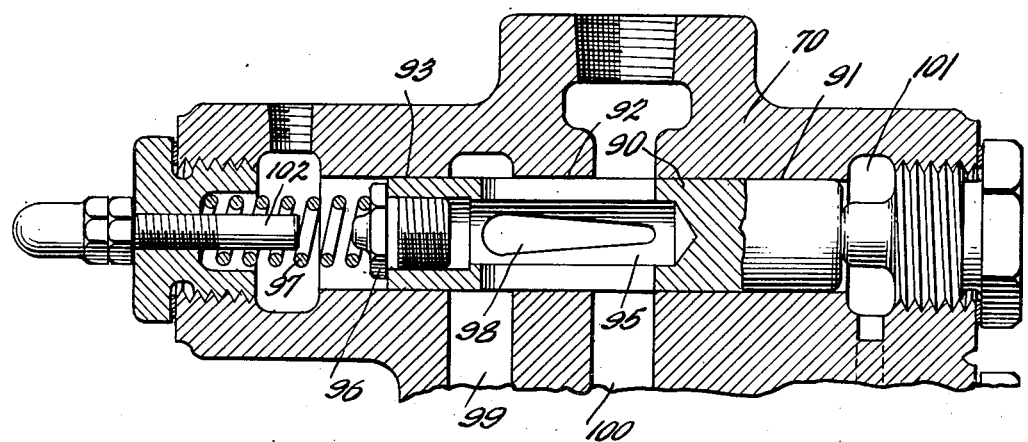
Fig. 5 is a fragmentary sectional view of the upper portion of a housing similar to Fig. 4 showing a further modified form of valve plunger.
Figure 6:
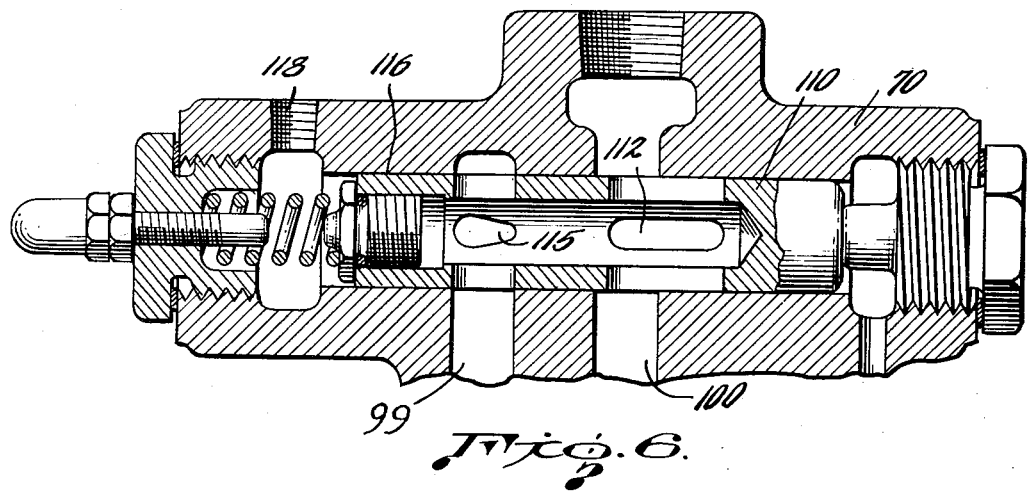
Fig. 6 is a view similar to Fig. 5 showing a still different type of valve plunger.

Figs. 4, 5 and 6 illustrate three embodiments of a valve for carrying out the same control as the valves of Figs. 1, 2 and 3. The three constructions of Figs. 4, 5 and 6 have identical housings 70 which do not differ materially from that illustrated in Figs. 1 and 2. The body of the housing, however, has been shortened at the lower portion resulting in a more compact check valve and check valve spring. This is clearly illustrated in Fig. 4 where the check valve plunger 72 is shown positioned by a relatively short spring 73 which does not need a center pin to maintain it straight. The housing has been elongated at 74 to accommodate the extended end 75 of the control plunger and to provide a housing for its spring 76 which is partially received in a pocket 77 in the end of the plunger and partly in a pocket 78 in the closure plug 79. A central adjustable spindle 80 threaded through the plug 79 provides a stop for limiting the movement of the flow controlling plunger and acts as a core for the spring.

In the embodiments of Figs. 4, 5 and 6 the need for an enlarged piston for operating the flow control plunger is avoided by housing the left end of the plunger in a vented bore in the extension 74. This insures against pressure being applied over the area of the left end of the plunger so that the pressure of the fluid in the rear chamber 82 acts against the spring. This chamber is supplied through bore 83 from inlet chamber 84 exactly as described in connection with the earlier figures. Pressures on the two tapers 86, 87 forming the neck cancel each other.

In Fig. 4 the control plunger 85 has a cylindrical right hand end closely fitting in its bore and has a tapered portion 86 in bore 28 whose function is the same as taper 42 in Fig. 2. This tapered portion 86, however, is connected by a neck 87 to the full left end portion 75 previously described. Operation is the same as for the form shown in Figs. 1 and 2. The increased simplicity of this construction and the elimination of the need for the counter bore and enlarged piston will be readily appreciated. Furthermore, the control plunger being supported at both ends is less likely to chatter.

In Fig. 5 the whole housing has not been illustrated since it is the same as in Fig. 4. The only change is in the plunger. In this case the plunger 90 is a heavy cylindrical rod of a diameter to have a close working fit in the three aligned bores 91, 92 and 93. The rod is bored from the left end as shown to provide a central chamber 95 whose end is closed by plug 96 against which the spring 97 bears. The thin wall of the drilled portion of the plunger is provided with tapered elongated through slots 98 which in the reposed position of the plunger, as shown, provide for flow between passages 99 and 100. As the valve plunger moves toward the left under the pressure of fluid in the chamber 101, the narrow end of the slots 98 are less and less exposed to chamber 100 and the flow is consequently throttled. The stop 102 comes into play before the flow is completely terminated. Obviously any reasonable number of slots 98 may be provided and the shape may be arranged as desired to effect the type of control necessary.

The area exposed to fluid pressure in chamber 101 is the full diameter of the plunger whereas the opposite end of the plunger is in a chamber vented to the reservoir. Therefore the spring 97 is the only opposition to pressure in 101.

In Fig. 6 the valve plunger 110 is not substantially different from that described in Fig. 5 but instead of a single slot or set of slots there are two sets. To the right are a plurality of elongated parallel sided slots 112 always substantially fully exposed to the passage 100 because of their length. The shorter tapered slots 115 are normally fully exposed to passage 99 but are progressively eclipsed by the wall of the bore 116 as the plunger moves to the left, slowly decreasing the rate of the flow.

In connection with Figs. 4, 5 and 6 it will be obvious that a cap of the type shown at 65 in Fig. 3 might be used to provide spring pressure adjustment where this is deemed desirable. Where the control plunger is a tight fit in a bore to the left of the passage connected to the lower port it is essential that a drain to the tank be provided for the space behind it to prevent locking. This is simply effected by a port such as 118 in Fig. 6.

I claim:
1. In a valve for use between a hydraulic hoist and a "raise and lower" valve, in combination, a housing having a valve port and a hoist port, a pair of overlapping passages in said housing respectively connected to said ports, a pair of spaced bores connecting said passages, said housing having a pair of plunger bores ex- tending inwardly from one surface thereof, coaxial respectively with said spaced bores and intersecting the passage connected to said "hoist" port, a check valve plunger in one of said plunger bores, a plug closing the surface end of said bore, a spring between said plug and plunger urging the latter to seat at the junction of the corresponding one of the spaced bores and the passage connected to the "hoist" port, a regulating plunger in the other plunger bore and extending into control cooperation with the other spaced bore, a plug closing the regulating plunger bore at the said housing surface, means cooperating with said valve port providing a flow restrictor, a connecting duct between said last mentioned bore and the "valve" port connected passage to deliver pressure from said restriction to the outer end of said regulating plunger and a spring urging said regulating plunger toward full open position.

2. The valve as claimed in claim 1 in which a regulating screw extends through a wall of said housing and cooperates with said connecting duct to throttle the flow of liquid to the rear of the regulating plunger.

3. The valve as claimed in claim 1 in which the valving end of the regulating plunger is conical, a stop is provided to prevent complete closing and an enlarged piston is associated with its other end to provide a differential closing pressure from the liquid supplied by said duct.

4. The valve as claimed in claim 1 in which the valving end of the regulating plunger is hollow and at all times extends into the corresponding one of said parallel bores, the said spring being in the hollow of said plunger, means on the housing to regulate the loading of the spring and an aperture in the wall of said last named plunger normally exposed in the 'hoist" connected passage but adapted to be progressively eclipsed as the plunger is urged toward said spring regulator.

5. The valve as claimed in claim 1 in which said plunger has a central chamber substantially longer than the distance between the adjacent walls of said passages as measured along said bore and is provided with at least one radial opening to cooperate with one of said passages.

6. The valve as claimed in claim 1 in which damping means is provided to prevent pulsations of said regulating plunger.

7. The valve as defined in claim 1 in which means is provided to damp pulsations of said regulating plunger.

8. The valve as defined in claim 1 in which the regulating plunger has an internal chamber closed at both ends, means always connecting said chamber to one of said overlapping passages, a radial slot connecting said chamber to the surface of the plunger where exposed in the other passage, said slot being positioned to be progressively eclipsed by the walls of the regulating plunger bore as the plunger is moved against its spring.

9. In a valve of the type described, in combination, a housing, a bore extending entirely through said housing and counterbored at the ends, closure plugs for said ends engaged in said counterbores, a control plunger reciprocable in said bore, a spring between one of said plugs and plunger biasing the latter against a stop on the other plug, a pair of spaced passages intersecting said bore intermediate the length of the plunger therein and connected respectively to "control valve" and "hoist" ports in said housing, means associated with said control valve port providing a flow restriction, a duct connecting the "control valve" passage to the stop-plug end of said bore to provide pressure liquid to move said plunger against said bias, said plunger having such a configuration that in its biased position it offers minimum obstruction to flow between said passages and progressively offers more obstruction as the plunger is moved by pressure of liquid in said duct.

10. The valve as claimed in claim 9 in which a restricting valve is provided for said duct to prevent pulsations of the plunger.

11. In a valve of the type described, in combination, a housing, a bore extending substantially through said housing and closed at both ends, a cylindrical plunger reciprocable in said bore, means biasing said plunger toward an end of said bore, a pair of passages intersecting said bore and connected respectively to a restricted "control valve" port and to a "hoist" port, a wall spacing said passages and having a portion of said bore therein, said plunger having an intermediate section of reduced diameter normally positioned in the "control valve" connected passage and the bore in said wall, a tapered portion connecting said reduced section to the end of the plunger adjacent the end of the bore toward which it is biased, and being adapted to at least partially close off the portion of the bore in the wall between said passages when moved against said bias and a restricted duct joining the passage connected to the "control valve" port to the bore behind the end of the plunger attached to said tapered portion.

12. The valve as claimed in claim 11 in which the biasing means is a spring partially housed in the opposite end of said plunger.

13. The valve as claimed in claim 11 in which a short bore provides a second connection between said passages, a check valve in control of said bore arranged to prevent flow from the "hoist" passage to the "valve" passage, means associated with the port for the "valve" passage providing a fixed orifice of such size as to cause the buildup of pressure in the "valve" passage when fluid flows from the hoist passage to the valve passage to actuate the said plunger against its bias.

HALL KIRKHAM.

REFERENCES CITED

The following references are of record in the file of this patent:

UNITED STATES PATENTS

| Number | Name | Date |
|---|---|---|
| 840,877 | Steedman | Jan. 8, 1907 |
| 1,467,522 | Amsler | Sept. 11, 1923 |
| 1,959,105 | McCarthy | May 15, 1934 |
| 2,272,684 | Vickers | Feb. 10, 1942 |
| 2,306,379 | Conradson | Dec. 29, 1942 |
| 2,317,563 | Tucker | Apr. 27, 1943 |